US010554108B2

(12) United States Patent
Jeong et al.

(10) Patent No.: US 10,554,108 B2
(45) Date of Patent: Feb. 4, 2020

(54) RESOLVER STATOR HAVING MULTILAYERED CORE

(71) Applicants: HYUNDAI MOTOR COMPANY, Seoul (KR); KIA MOTORS CORPORATION, Seoul (KR)

(72) Inventors: Myung Kyu Jeong, Seoul (KR); Jung Woo Lee, Hwaseong-si (KR); Jae Min Yu, Incheon (KR); Ga Eun Lee, Seongnam-si (KR); Young Jin Seo, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 56 days.

(21) Appl. No.: 15/830,667

(22) Filed: Dec. 4, 2017

(65) Prior Publication Data
US 2019/0115815 A1    Apr. 18, 2019

(30) Foreign Application Priority Data
Oct. 18, 2017    (KR) .................. 10-2017-0135105

(51) Int. Cl.
*H02K 24/00* (2006.01)
*H02K 11/01* (2016.01)
*H02K 11/21* (2016.01)
*H02K 1/02* (2006.01)
*H02K 1/16* (2006.01)

(52) U.S. Cl.
CPC .............. *H02K 24/00* (2013.01); *H02K 1/02* (2013.01); *H02K 1/16* (2013.01); *H02K 11/01* (2016.01); *H02K 11/21* (2016.01)

(58) Field of Classification Search
CPC . H02K 1/02; H02K 1/16; H02K 11/01; H02K 11/21; H02K 24/00
USPC ... 310/68 B, 216.015–18, 216.035, 216.048, 310/216.052, 216.059, 216.081, 216.108, 310/216.114–115
See application file for complete search history.

(56) References Cited

U.S. PATENT DOCUMENTS

| | | | | |
|---|---|---|---|---|
| 4,499,660 | A * | 2/1985 | Lenz | H02K 1/32 164/109 |
| 4,712,027 | A * | 12/1987 | Karidis | H02K 1/08 310/12.02 |
| 4,942,324 | A * | 7/1990 | Ooyama | H02K 1/26 310/216.007 |
| 5,477,096 | A * | 12/1995 | Sakashita | H02K 1/06 310/216.016 |
| 2003/0048030 | A1* | 3/2003 | Griffith | H02K 1/20 310/254.1 |
| 2004/0104638 | A1* | 6/2004 | Yoneda | H02K 1/148 310/216.012 |

(Continued)

FOREIGN PATENT DOCUMENTS

KR    10-2014-0127067 A    11/2014

*Primary Examiner* — Mang Tin Bik Lian
*Assistant Examiner* — Rashad H Johnson
(74) *Attorney, Agent, or Firm* — Knobbe Martens Olson & Bear LLP

(57) ABSTRACT

A resolver is installed inside a housing of a motor. A stator of the resolver has a three layered core. a main layer of an electric steel sheet, a first shielding layer of a magnetic metal, a second shielding layer interposed between the domain layer and the first to shielding layer. The second shielding layer is made of a non-magnetic material.

3 Claims, 6 Drawing Sheets

(56) References Cited

U.S. PATENT DOCUMENTS

2004/0245883 A1\* 12/2004 Mitcham .................. H02K 1/02
  310/261.1
2011/0266896 A1\* 11/2011 Smadja .................... H02K 1/20
  310/59

\* cited by examiner

RESOLVER STATOR HAVING MULTILAYERED CORE

CROSS REFERENCE TO RELATED APPLICATION

The present application claims priority of Korean Patent Application No. 10-2017-0135105 filed on Oct. 18, 2017, the entire contents of which is incorporated herein for all purposes by this reference.

BACKGROUND

Field

The present invention relates to a resolver stator, to a method for correcting a slip while a vehicle is coasting, and more particularly, to a resolver stator which may secure robustness of electromagnetic noise of a resolver.

Description of the Related Art

In the control of a rotating device, for example, a motor, a movement or a rotational position of a rotary body should be accurately measured by a rotation angle detecting device installed in a rotary shaft. Examples of the rotation angle detecting device include a resolver and an encoder, and these detecting devices have advantages and disadvantages.

Among them, the resolver directly detects an absolute position of a rotor, and calculates a rotation direction and a rotation speed based on a change in the position of the rotor. In more detail, the resolver, which is a sensor configured to precisely measure a rotation speed and a rotation angle of a motor, has a structure in which a signal injection coil and an output coil are located in a resolver stator and a resolver rotor having an elliptical shape or a multi-polar shape is located inside the resolver stator.

The disclosure of this section is to provide background of the invention. Applicant notes that this section may contain information available before this application. However, by providing this section, Applicant does not admit that any information contained in this section constitutes prior art.

SUMMARY

A resolver can be installed inside a housing of a motor. In this case, output is distorted due to an influence of a magnetic flux (electromagnetic noise) generated by a permanent magnet and the like of a motor stator or a motor rotor inside the housing.

Accordingly, an aspect of the present invention is to provide a resolver stator which may secure robustness of electromagnetic noise of a resolver.

The present invention may provide a resolver stator including a main core formed of an electric steel sheet, and a first shielding core attached to at least one surface of the main core on one surface of the first shielding core and formed of a non-magnetic material.

According to an embodiment of the present invention, the resolver stator may further include a second shielding core attached to the other surface of the first shielding core and formed of magnetic metal.

According to embodiments of the present invention, the first shielding core may be in contact with the main core on the entire one surface of the main core.

According to embodiments of the present invention, the main core may include a ring-shaped body, and a plurality of teeth protruding from the body in a radial direction of the body.

According to embodiments of the present invention, the first shielding core may be in contact with the main core at areas corresponding to the body and the teeth, and the second shielding core may be in contact with the first shielding core at an area corresponding to the entire other surface of the first shielding core.

According to embodiments of the present invention, the first shielding core may be in contact with the main core at an area corresponding to the body, and may not be in contact with the main core at areas corresponding to the teeth, and the second shielding core may have a planar surface having a shape corresponding to the body and the teeth, and may be in contact with the first shielding core at the area corresponding to the body, and a space may be formed between the main core and the second shielding core at the areas corresponding to the teeth.

According to embodiments of the present invention, at least one fastening hole into which a fastening structure configured to fasten the resolver stator to another structure is inserted may be penetrated in the body, the first shielding core, and the second shielding core in a stacked direction.

The present invention may also provide a resolver stator including a main core formed of an electric steel sheet, a first shielding core attached to at least one surface of the main core on one surface of the first shielding core and formed of a non-magnetic material, and a second shielding core attached to the other surface of the first shielding core and formed of magnetic metal, in which the first shielding core spaces the main core and the second shielding core apart from each other to prevent the second shielding core from being directly in contact with the main core.

According to the resolver stator, electromagnetic noise generated by a motor is prevented from adversely affecting the resolver, so that robustness of the electromagnetic noise may be secured. In particular, according to the resolver stator, a space in a housing for distance separation between a motor stator and a motor rotor of the motor or a space in the housing for installing a separate shielding structure is not required, so that it is advantageous to miniaturize the motor itself.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF EMBODIMENTS

Hereinafter, a resolver stator according to various embodiments of the present invention will be described in more detail with reference to the accompanying drawings.

An aspect of the present invention provides a resolver for measuring a rotational position of a motor rotor. In embodiments, the resolver 11, 12 is installed inside motor housing.

In embodiments, when viewed along a first direction perpendicular to the rotational axis of the motor, the entirety of the resolver 11, 12 overlaps at least one of the motor stator 100 and the rotor 200. The resolver 11, 12 does not protrude from the motor stator 100 or the rotor 200 when viewed along the first direction such that housing the resolver would not increase the size of the housing along a direction parallel to the rotational axis.

Figure 1:
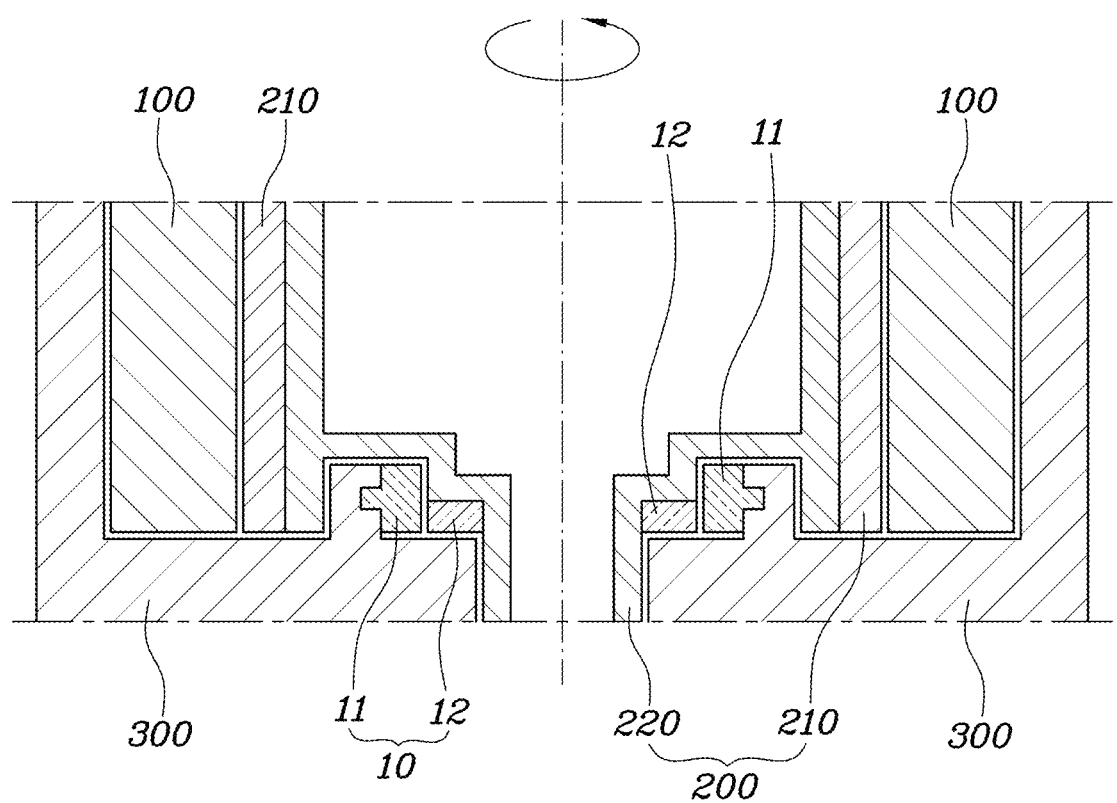
FIG. 1 is a sectional view schematically illustrating a structure of a motor in which a resolver having a resolver stator according to an embodiment of the present invention is installed.

In embodiments, as illustrated in FIG. 1, along a direction perpendicular to the rotational axis of the motor, rotation shaft 220 of the rotor 200, resolver rotor 12, resolver stator 11, motor stator 100, and a side wall of motor housing 300 are arranged in order (from rotational axis toward outside of the motor).

In embodiments, as illustrated in FIG. 1, rotation shaft 220 has a recess to receive resolver rotor 12 and resolver stator 11 such that an inner portion of rotation shaft 220 (to which resolver rotor 12 is attached, having a first diameter corresponding to a through hole of the housing 300), resolver rotor 12, resolver stator 11, an outer portion of the rotation shaft 220 (having a second diameter larger than the first diameter of the inner portion), and permanent magnet 210, and motor stator 100, and a side wall of motor housing 300 are arranged in order along a direction perpendicular to the rotational axis of the motor (from rotational axis toward outside of the motor).

In embodiments, resolver stator 11 is fixed to the housing 300 and is distanced from a portion of rotation shaft 220 with a gap therebetween. No separate shielding structure is installed in the gap such that the gap between the resolver stator 11 and the rotation shaft 220 is substantially the same as the gap between the rotation shaft 220 and the housing along a direction parallel to the rotational axis.

FIG. 1 is a sectional view schematically illustrating a structure of a motor in which a resolver having a resolver stator according to an embodiment of the present invention is installed.

Referring to FIG. 1, basically, a motor (in FIG. 1, a permanent magnet synchronous motor is illustrated as an example) may include a motor stator 100 on which a coil is wound and a motor rotor 200 having a permanent magnet 210 provided therein. A resolver 10 as a position sensor configured to identify a rotational position (that is, the position of the permanent magnet 210 of the rotor) of a motor rotor is arranged around a rotary shaft 220 of the rotating motor rotor 200.

In FIG. 1, the resolver 10 may include a resolver rotor 12 installed in the rotary shaft 220 of the motor rotor 200 and a resolver stator 11 attached to an interior of a housing 300 of the motor to be arranged at a position corresponding to a circumference of the resolver rotor 12.

In particular, the structure of the motor illustrated in FIG. 1 corresponds to an example where the resolver 10 is installed inside the housing 300 of the motor together with other components constituting the motor.

In this way, because the resolver 10 is arranged inside the housing 300 of the motor together with other components of the motor and is thus affected by a magnetic flux (electromagnetic noise) generated between the stator and the rotor of the motor, accuracy of position detection deteriorates, and accordingly, it is difficult to secure motor controllability. In particular, as illustrated in FIG. 1, when the resolver stator 11 is arranged at a position where it may directly face the motor stator 100 and the permanent magnet 210, a main magnetic flux of the motor directly affects the resolver 10.

In the related art, in order to solve the above-described problem, a scheme in which a resolver is installed at a sufficiently spaced position or a scheme in which a shielding structure capable of blocking electromagnetic noise is separately installed in a housing of a motor around a resolver stator is adopted such that a magnetic flux by a motor stator and a permanent magnet is not affected.

In a technique for blocking effects of electromagnetic noise, because a space for securing a sufficient distance or installing a shielding structure is required, it is disadvantageous to miniaturize the motor.

Because the resolver stator 11 according to an embodiment of the present invention includes a structure for blocking electromagnetic noise and a separate separation distance or an external shielding structure is thus not required, a great advantage in miniaturizing the motor is provided.

Figure 2:
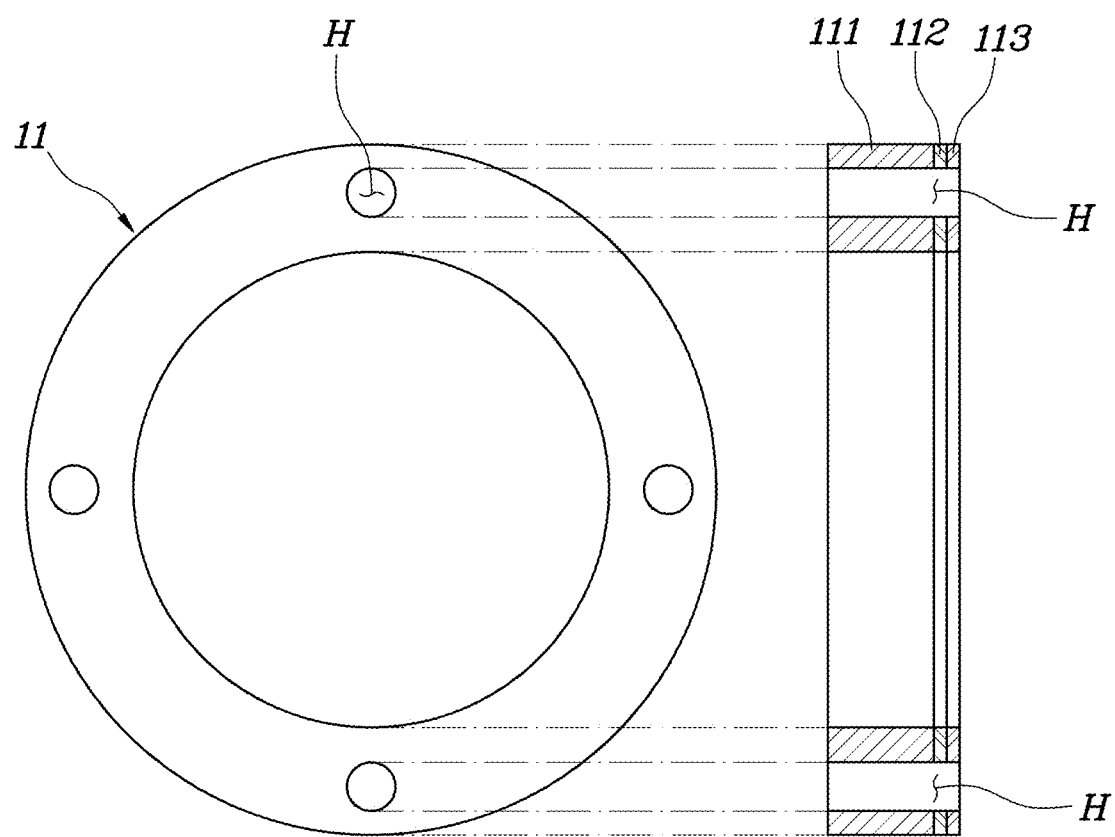
FIG. 2 is a plan view and a sectional view illustrating the resolver stator according to embodiments of the present invention.

FIG. 2 is a plan view and a sectional view illustrating the resolver stator according to embodiments of the present invention.

Referring to FIG. 2, the resolver stator 11 according to embodiments of the present invention may include a main core 111 made of an electric steel sheet and a first shielding core 112 attached to at least one surface of the main core 111 on one surface thereof and made of a non-magnetic material. Further, the resolver stator 11 according to embodiments of the present invention may further include a second shielding core 113 attached to the other surface of the first shielding core 112 and made of magnetic metal.

The first shielding core 112 may be made of a non-magnetic material. That is, the first shielding core 112 is made of a material that is hard to be magnetized, thereby preventing electromagnetic noise from being transferred to the main core 111. Both metal not having magnetism or nonmetal (for example, synthetic resin, and the like) may be adopted as a material for producing the first shielding core 112.

However, in order to prevent the electromagnetic noise from being transferred to the main core 111 by using only the first shielding core 112, the first shielding core 112 should have a sufficient thickness and a direction in which the electromagnetic noise is transferred should be considered. Accordingly, in order to further improve an effect of blocking the electromagnetic noise by the first shielding core 112, in embodiments of the present invention, the second shielding core 113 made of magnetic metal is formed on the other surface of the first shielding core 112. In embodiments, permeability of the second shielding layer 113 is greater than that of the first the shielding layer 112. In embodiments, thickness of the main layer 111 is substantially greater than those of the first and second shielding layer 112, 113.

The second shielding core 113 may be made of magnetic metal. Thus, the second shielding core 113 may absorb electromagnetic noise around the resolver stator 11, and may eliminate the absorbed electromagnetic noise therein through an eddy current and the like.

Because the second shielding core 113 having magnetism may focus surrounding electromagnetic noise, it is unnecessary to consider directionality, and the first shielding core 112 may prevent the electromagnetic noise focused on the second shielding core 113 from being transferred to the main core 111. Therefore, the second shielding core 113 should not be directly in contact with the main core 111, and the first shielding core 112 may be arranged between the main core 111 and the second shielding core 113 such that the second shielding core 113 and the main core 111 are spaced apart from each other and thus may be prevented from being directly in contact with each other. The first shielding core 112 may be arranged in various forms on the entire one surface or a portion of the one surface of the main core 111 to prevent a contact between the second shielding core 113 and the main core 111.

The resolver stator 11 according to embodiments of the present invention may include fastening holes H penetrated in a direction in which the main core 111, the first shielding core 112, and the second shielding core 113 are stacked. The fastening holes H may be used when the resolver stator 11 is fixed and attached to the interior of the housing ("300" in FIG. 1) of the motor through a fastening unit such as a bolt. In this way, because the resolver stator 11 according to embodiments of the present invention may be attached to the interior of the housing of the motor using the fastening holes H, the structure of the resolver stator 11 is advantageous to miniaturize the motor.

Figure 3:
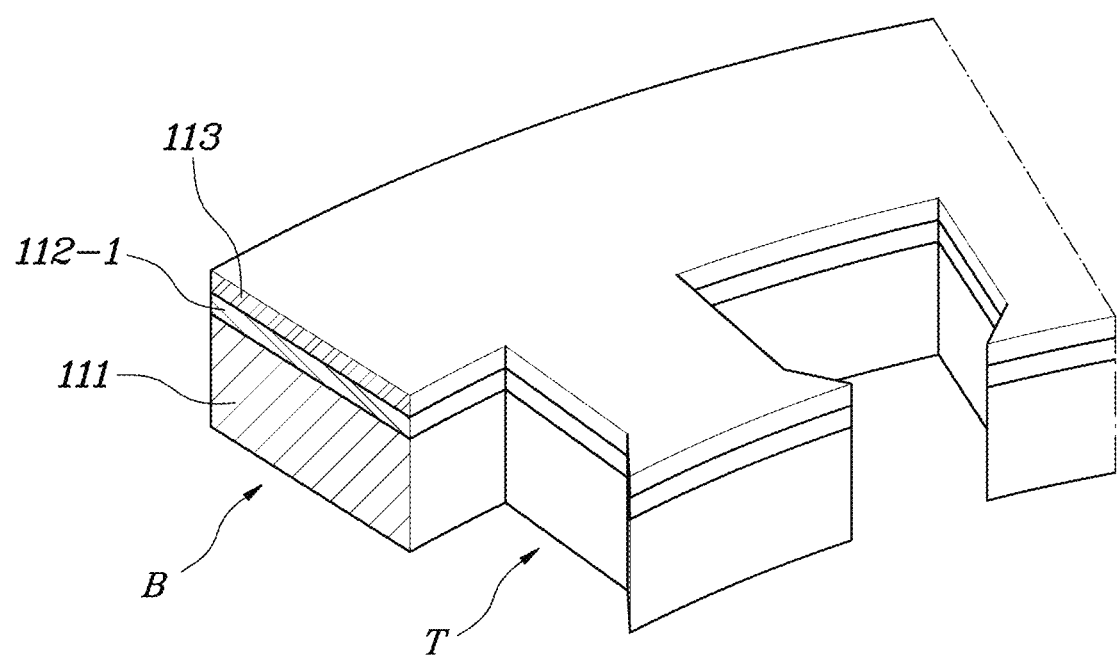
FIGS. 3 and 4 are a cutaway perspective view and an exploded perspective view illustrating the resolver stator according to embodiments of the present invention.
Figure 4:
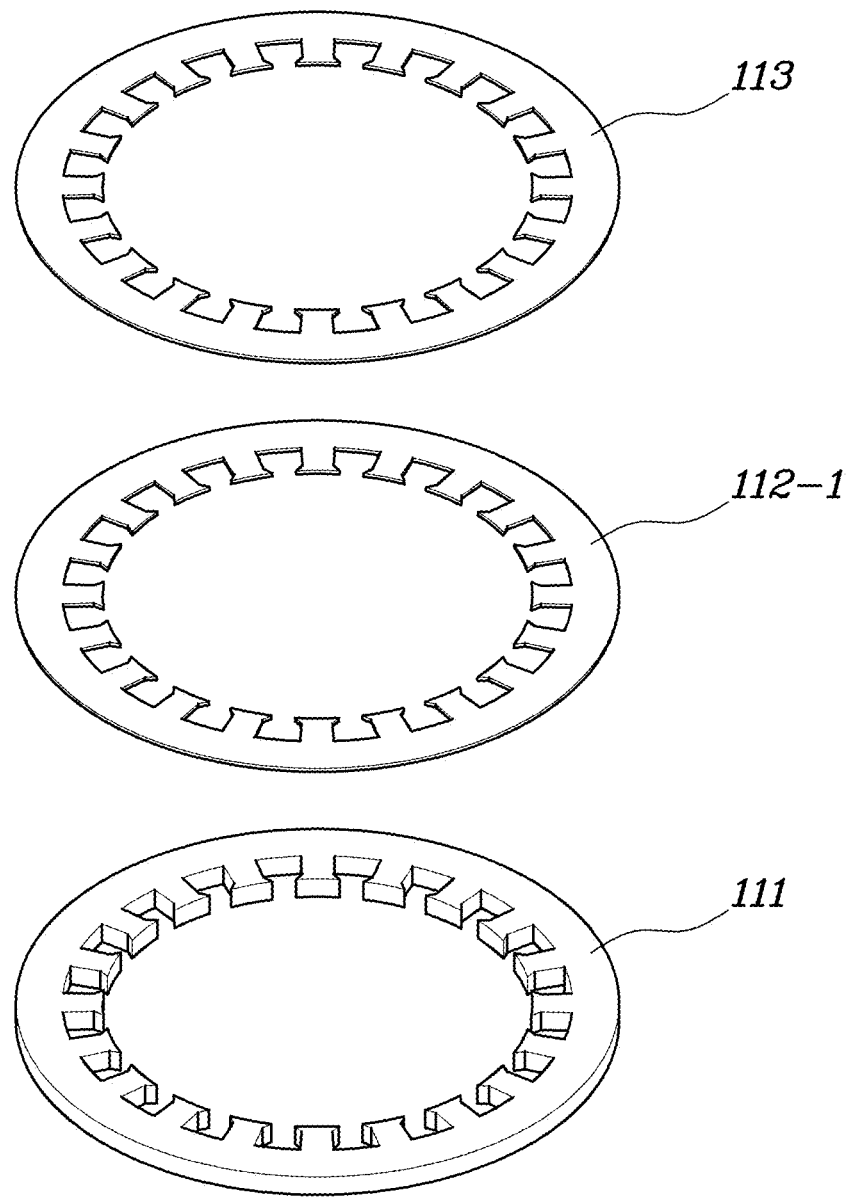

FIGS. 3 and 4 are a cutaway perspective view and an exploded perspective view illustrating the resolver stator according to embodiments of the present invention.

In embodiments illustrated in FIGS. 3 to 6, the main core 111 of the resolver stator 11 may include a ring-shaped body B and a plurality of teeth protruding from the body B in a radial direction of the body B.

A coil may be wound on the teeth T. For example, a signal injection coil into which a signal configured to generate an alternating current (AC) magnetic field is injected and an output coil configured to generate an AC magnetic field and output a voltage induced by rotation of the resolver rotor 12 may be wound on the teeth T.

For reference, the resolver stator 11 illustrated in FIG. 2 is a resolver stator not having teeth, and coils are attached to an inner periphery of the resolver stator. It should be understood that the resolver stator illustrated in FIG. 2 includes only the body B.

As illustrated in FIGS. 3 and 4, in embodiments, the planar shapes of the main core 111, a first shielding core 112-1, and the second shielding core 113 may be identical to each other. That is, the first shielding core 112-1 may be in contact with the main core 111 at an area corresponding to the body B and the teeth T. Further, the second shielding core 113 may be in contact with the first shielding core 112-1 at an area corresponding to the entire other surface of the first shielding core 112-1.

Figure 5:
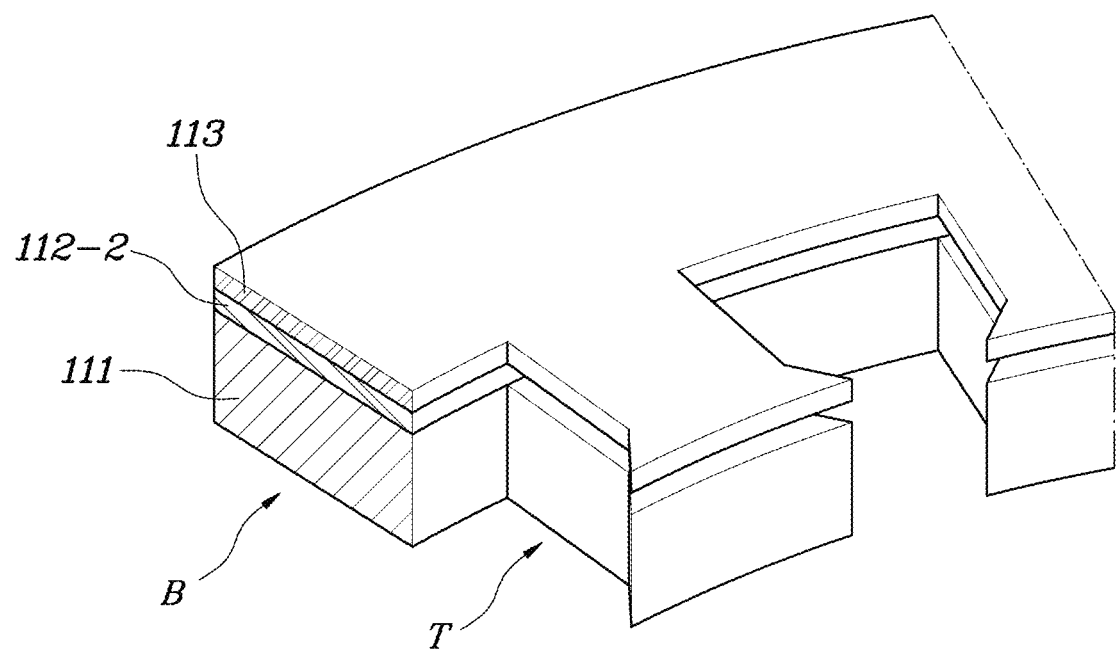
FIGS. 5 and 6 are a cutaway perspective view and an exploded perspective view illustrating the resolver stator according to another embodiment of the present invention.
Figure 6:
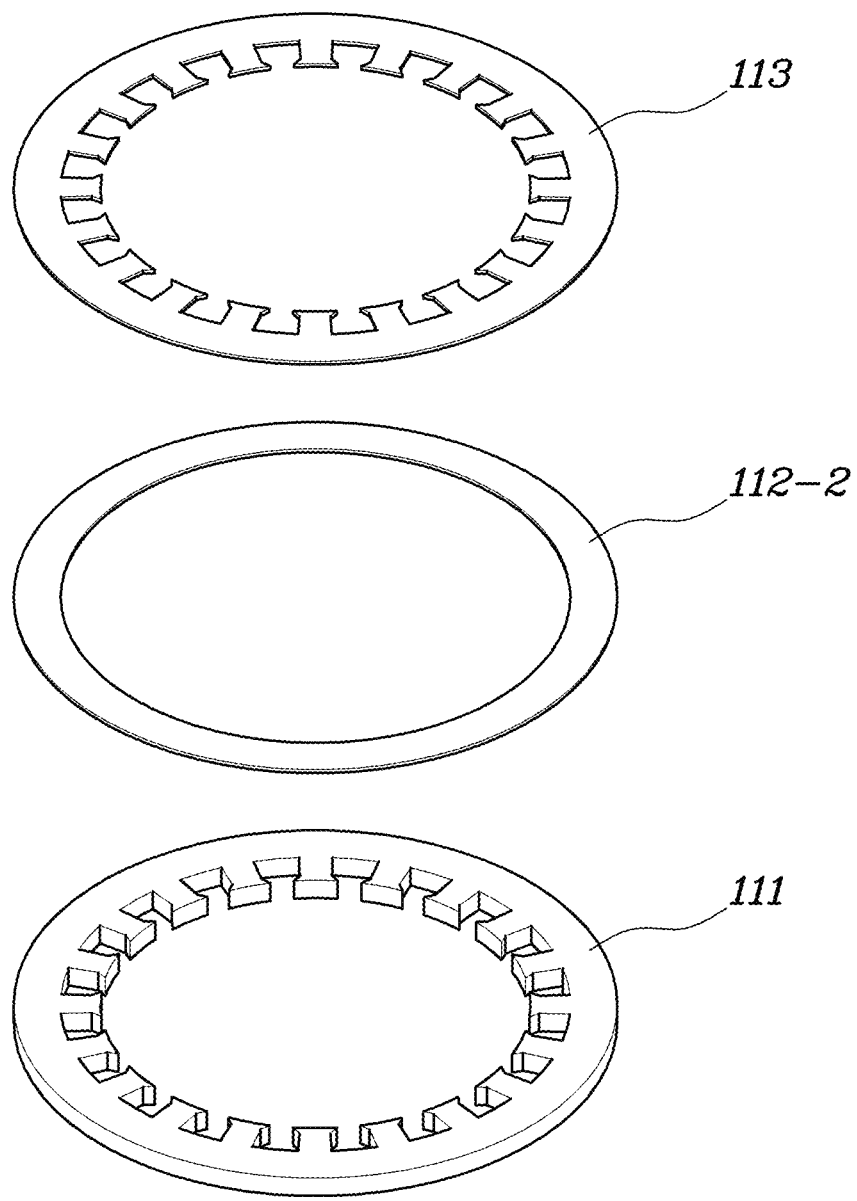

As illustrated in FIGS. 5 and 6, in embodiments, the planar shapes of the main core 111 and the second shielding core 113 are identical to each other, and a first shielding core 112-2 may have a planar surface corresponding to the planar shape of the body B of the main core 111. That is, the first shielding core 112-2 is in contact with the main core 111 at an area corresponding to the body B, and is not in contact with the main core 111 at an area corresponding to the teeth T. Further, the second shielding core 113 may have a planar surface having a shape corresponding to the body B and the teeth T, to be in contact with the first shielding core 112-2 at an area corresponding to the body B. According to such a structure, an empty space is formed between the main core 111 and the second shielding core 113 at an area corresponding to the teeth T without any other structure.

As illustrated in FIGS. 3 and 4, in embodiments, a physical structure of a first fastening core 111-1 exists between the main core 111 and the second shielding core 113 at an area corresponding to the teeth T, so that a mechanically firmer structure may be formed.

Further, as illustrated in FIGS. 5 and 6, in embodiments, a structure does not exist between the main core 111 and the second shielding core 113 at the area corresponding to the teeth T and the non-magnetic material is replaced with air, so that material costs consumed for producing the first shielding core may be reduced.

Meanwhile, as illustrated in FIGS. 3 to 6, in embodiments, the first shielding core and the second shielding core are separately produced to be fastened to a motor housing in a state in which the first shielding core and the second shielding core are sequentially stacked on the main core. Otherwise, after the first shielding core and the second shielding core are produced in advance to be bonded to each other, the first shielding core and the second shielding core may be fastened to the motor housing together with the main core.

As described above, the resolver stator according to various embodiments of the present invention may prevent the electromagnetic noise generated by the motor from adversely affecting the resolver, thereby securing robustness for the electromagnetic noise. In particular, in the resolver stator according to various embodiments of the present invention, a space in a housing for distance separation between the motor stator and the motor rotor of the motor or a space in the housing for installing a separate shielding structure is not required, so that it is advantageous to miniaturize the motor itself.

Although certain embodiments of the present invention has been illustrated and described above, it is obvious to those skilled in the art that the present invention may be variously modified and changed without departing from the technical spirit of the present invention provided by the appended claims.

What is claimed is:

1. A resolver stator comprising:
    a main core formed of an electric steel sheet;
    a first shielding core attached to at least one surface of the main core such that the main core is disposed on one surface of the first shielding core, wherein the first shielding core is formed of a non-magnetic material; and
    a second shielding core attached to the other surface of the first shielding core and formed of magnetic metal,
    wherein the main core comprises a ring-shaped body and a plurality of teeth protruding from the body in a radial direction of the body,
    wherein the first shielding core comprises a body that is in contact with the body of the main core, wherein the first shielding core is not in contact with the teeth of the main core,
    wherein the second shielding core comprises a body that is in contact with the body of the first shielding core and a plurality of teeth that correspond to the teeth of the main core,
    wherein the body of the first shielding core is disposed between the body of the main core and the body of the second shielding core, and the first shielding core does not comprise a portion disposed between the teeth of the main core and the teeth of the second shielding core such that a space is formed between the teeth of the main core and the teeth of the second shielding core.

2. The resolver stator of claim 1, wherein at least one fastening hole into which a fastening structure configured to fasten the resolver stator to another structure is inserted is penetrated in the body, the first shielding core, and the second shielding core in a stacked direction.

3. A resolver stator comprising:
    a main core formed of an electric steel sheet;

a first shielding core attached to at least one surface of the main core such that the main core is disposed on one surface of the first shielding core, wherein the first shielding core is formed of a non-magnetic material; and a second shielding core attached to the other surface of the first shielding core and formed of magnetic metal, wherein the first shielding core spaces the main core and the second shielding core apart from each other to prevent the second shielding core from being directly in contact with the main core, wherein the main core comprises a ring-shaped body and a plurality of teeth protruding from the body in a radial direction of the body, wherein the first shielding core comprises a body that is in contact with the body of the main core, wherein the first shielding core is not in contact with the teeth of the main core, wherein the second shielding core comprises a body that is in contact with the body of the first shielding core and a plurality of teeth corresponding to the teeth of the main core, wherein the body of the first shielding core is disposed between the body of the main core and the body of the second shielding core, and the first shielding core does not comprise a portion disposed between the teeth of the main core and the teeth of the second shielding core such that a space is formed between the teeth of the main core and the teeth of the second shielding core.

* * * * *